(12) United States Patent
Furney et al.

(10) Patent No.: US 8,341,047 B1
(45) Date of Patent: Dec. 25, 2012

(54) SYSTEMS AND METHODS FOR OPTIMIZING AN ELECTRONIC ADVERTISING CAMPAIGN BASED ON ORGANIC CONTENT

(75) Inventors: Doug Furney, Frisco, TX (US); Bill Hodack, Prosper, TX (US); Todd Crandell, Frisco, TX (US); Mike Shell, McKinney, TX (US)

(73) Assignee: Metrix4Media, LLC, Frisco, TX (US)

( * ) Notice: Subject to any disclaimer, the term of this patent is extended or adjusted under 35 U.S.C. 154(b) by 690 days.

(21) Appl. No.: 12/180,072

(22) Filed: Jul. 25, 2008

(51) Int. Cl.
*G06Q 40/00* (2006.01)
(52) U.S. Cl. ............................................. 705/35; 705/14
(58) Field of Classification Search .................... 705/14, 705/35–40
See application file for complete search history.

(56) References Cited

U.S. PATENT DOCUMENTS

2010/0017289 A1* 1/2010 Sah et al. .................. 705/14.49

* cited by examiner

*Primary Examiner* — Thu Thao Havan
(74) *Attorney, Agent, or Firm* — Hunton & Williams LLP

(57) ABSTRACT

A system and method for optimizing an electronic advertising campaign based on organic content by determining organic content of an advertising venue display, determining an organic display parameter for an advertisement based on organic content of the display, and adjusting one or more advertising parameters based at least in part on the organic display parameter. The advertising parameters may comprise one or more keywords, one or more advertising venues, one or more placement values, the content of the advertisement, or any other parameter.

23 Claims, 13 Drawing Sheets

FIG. 6

Advertising Campaign Data

| | 1 | 2 | 3 |
|---|---|---|---|
| Campaign Number | 1 | | |
| Advertiser ID | Widget Co. | | |
| Keyword(s) | widget, widgets, "widgets for sale" | | |
| Time Parameter | 1/1/09 | | |
| Monetary Amount | $1,000 per month | | |
| Advertising Venues | All | | |
| Bidding Strategy | Dominant | | |
| Advertisement ID | 1234abcd | | |

FIG. 7

Action Data

| Action Number | 1 | 2 | 3 | 4 | 5 |
|---|---|---|---|---|---|
| Date/Time | 8/7/08, 1:18 PM | 7/1/08, 1:12 PM | | | |
| Action Type | Click | E-mail | | | |
| Advertisement ID | 1234abcd | 1234abcd | | | |
| Keyword(s) | Widget | Widget | | | |
| Referrer ID | search.com | johndoe@email.com | | | |

FIG. 8

Efficiency Data

| | 1 | 2 | 3 | 4 | 5 |
|---|---|---|---|---|---|
| Entry Number | | | | | |
| Date/Time | 1/1/08, 8:00 AM | | | | |
| Advertising Venue | search.com | | | | |
| Keyword | widgets | | | | |
| Campaign Number | 1 | | | | |
| Action 1 Weight | 20% | | | | |
| Action 2 Weight | 30% | | | | |
| Action 3 Weight | 40% | | | | |
| Efficiency Rank | 3 | | | | |
| Price Target | $0.60 | | | | |
| Actual Price | $0.60 | | | | |
| Margin Weight | 10% | | | | |
| Price Rank | 0 | | | | |

SYSTEMS AND METHODS FOR OPTIMIZING AN ELECTRONIC ADVERTISING CAMPAIGN BASED ON ORGANIC CONTENT

FIELD OF THE INVENTION

The present inventions relate to systems and methods for optimizing an electronic advertising campaign based on organic content.

BACKGROUND OF THE INVENTION

Electronic advertising campaigns have become increasingly sophisticated in recent years. Individuals and companies now have an enormous number of potential advertising venues in which to advertise their products and services. With limited budgets, however, advertisers naturally want to make sure that they use their money in the most efficient way possible. For example, choosing the right venues, keywords, and bid prices can make a huge difference in the effectiveness of an electronic advertising campaign. It may be very difficult, however, for advertisers to recognize the most efficient choices, particularly when electronic advertising data is constantly changing.

These and other drawbacks exist with current systems.

SUMMARY OF THE INVENTION

Various exemplary embodiments provide for optimizing an electronic advertising campaign by adjusting advertising parameters based on organic content.

An advertiser running an advertising campaign today has a wealth of available electronic venues in which to advertise. Internet search engines, online directories, online file sharing sites, and electronic content publishers all typically display advertisements for a fee. As the number of advertising venues has increased, so has the complexity of the models with which advertisements can be provided. For example, many venues now operate auction systems where advertisers "bid" on particular keywords by specifying the maximum amount that they are willing to pay per click and the venues use complicated formulas to place ads based on the bid prices, relevance, time, and many other factors. For an advertiser, determining the best venues in which to advertise, the best keywords (or other relevance criteria) to use, and the right amount to spend on each keyword or criteria can be very complex.

In general, each advertising venue wants to maximize its own revenue. In a "pay per click" business model, that entity may only be paid for "clicks." Therefore, it maximizes its revenue by delivering the advertisements that generate the most revenue—the number of clicks times cost per click (which may be less than the bid price, e.g., the maximum price that the advertiser was willing to pay). Because the advertising venue wants to maximize its own revenue, the ad with the highest bid for a particular keyword may not always be listed first. For example, if Company A bids $0.50 per click and Company B bids $0.25 per click, but Company A's advertisement generates 100 clicks per 1000 impressions while Company B's advertisement generates 300 clicks per 1000 impressions, the ad for Company B may be shown instead because it will generate more revenue for the advertising venue.

The advertiser also wants to maximize its revenue by generating the most productive leads at the lowest price. Typically, more productive leads are generated by providing a relevant advertisement in a location where the advertisement will be noticed by the viewer (e.g., at the top of a web page rather than the bottom). Making decisions based on organic content may allow an advertiser to avoid spending money on advertising where unnecessary or to focus on particularly important keywords and thereby maximize the value of what the advertiser spends on its electronic advertising campaign.

In one illustrative example, the following entities and computer systems may be involved in an electronic advertising campaign. One or more advertising venue computer systems may each be associated with an advertising venue where an advertisement may be placed, such as the advertisement space on the results page of an Internet search engine. One or more advertiser computer systems may each be associated with an advertiser that desires to advertise on those venues. One or more end user computer systems may each be associated with an end user who views the advertiser's ad and performs various actions. For example, the end user may be an individual who purchases products from the advertiser. Finally, a campaign optimization computer system may perform various functions to optimize the electronic advertising campaign of the advertiser.

An advertiser computer system may communicate with the campaign optimization computer system to establish the advertiser's electronic advertising campaign and set various parameters for the campaign, such as what to advertise, where and when to advertise, how much to spend, and what keywords to use to drive traffic to the advertiser. The campaign optimization computer system may place the advertiser's ad with a number of advertising venues, such as search engines and online directories. The campaign optimization computer system may also periodically determine organic content displayed on various advertising venues. Organic content may be understood to be content of a display (e.g., a web page, a display on a wireless/mobile device or personal digital assistant) that is distinct from paid advertisements. For example, organic content may be the organic search results displayed after an end user enters a search term into an Internet search engine or the text of a news article on a web page. The campaign optimization computer system may determine an organic display parameter based on the organic content of the display. For example, the organic display parameter may be a measure of the position of information associated with the advertiser within the organic content, such as the advertiser's name or the name of one of its products. If the organic display parameter indicates that information for the advertiser is already listed prominently on the display, the advertising parameters may be adjusted so that the advertiser may avoid wasting money on particular keywords. For example, the campaign optimization computer system may decide not to place an ad or may lower the bid price of the keyword and increase the bid prices of other keywords instead. Correspondingly, if the organic display parameter indicates that it would be useful to display an advertisement, such as when information about the advertiser is not present in the display, the advertising parameters may be adjusted accordingly. For example, the bid price for the keyword may be increased to increase the chances that the advertiser's ad will be displayed.

Other embodiments are also within the scope of the invention.

BRIEF DESCRIPTION OF THE DRAWINGS

The present invention, together with further objects and advantages, may best be understood by reference to the following description taken in conjunction with the accompanying drawings, in the several Figures of which like reference numerals identify like elements, and in which:

FIG. 6 depicts exemplary advertising campaign data according to various embodiments of the disclosure;

FIG. 7 depicts exemplary action data according to various embodiments of the disclosure;

FIG. 8 depicts exemplary efficiency data according to various embodiments of the disclosure;

DETAILED DESCRIPTION OF EXEMPLARY EMBODIMENT(S)

The following description is intended to convey a thorough understanding of the embodiments described by providing a number of specific embodiments and details involving systems and methods for optimizing an electronic advertising campaign. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Figure 1:
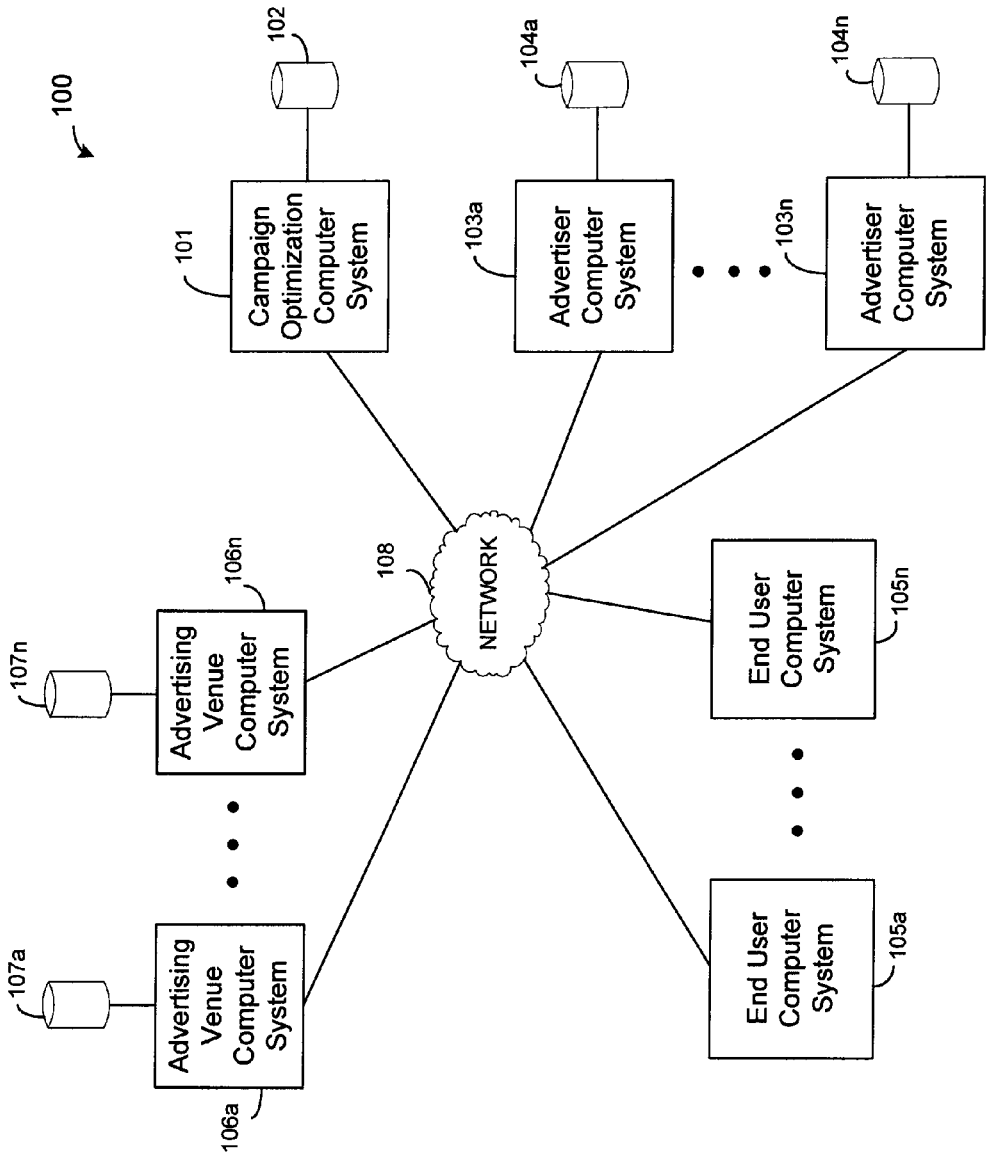
FIG. 1 depicts an exemplary system for optimizing an electronic advertising campaign according to various embodiments of the disclosure.
Figure 2:
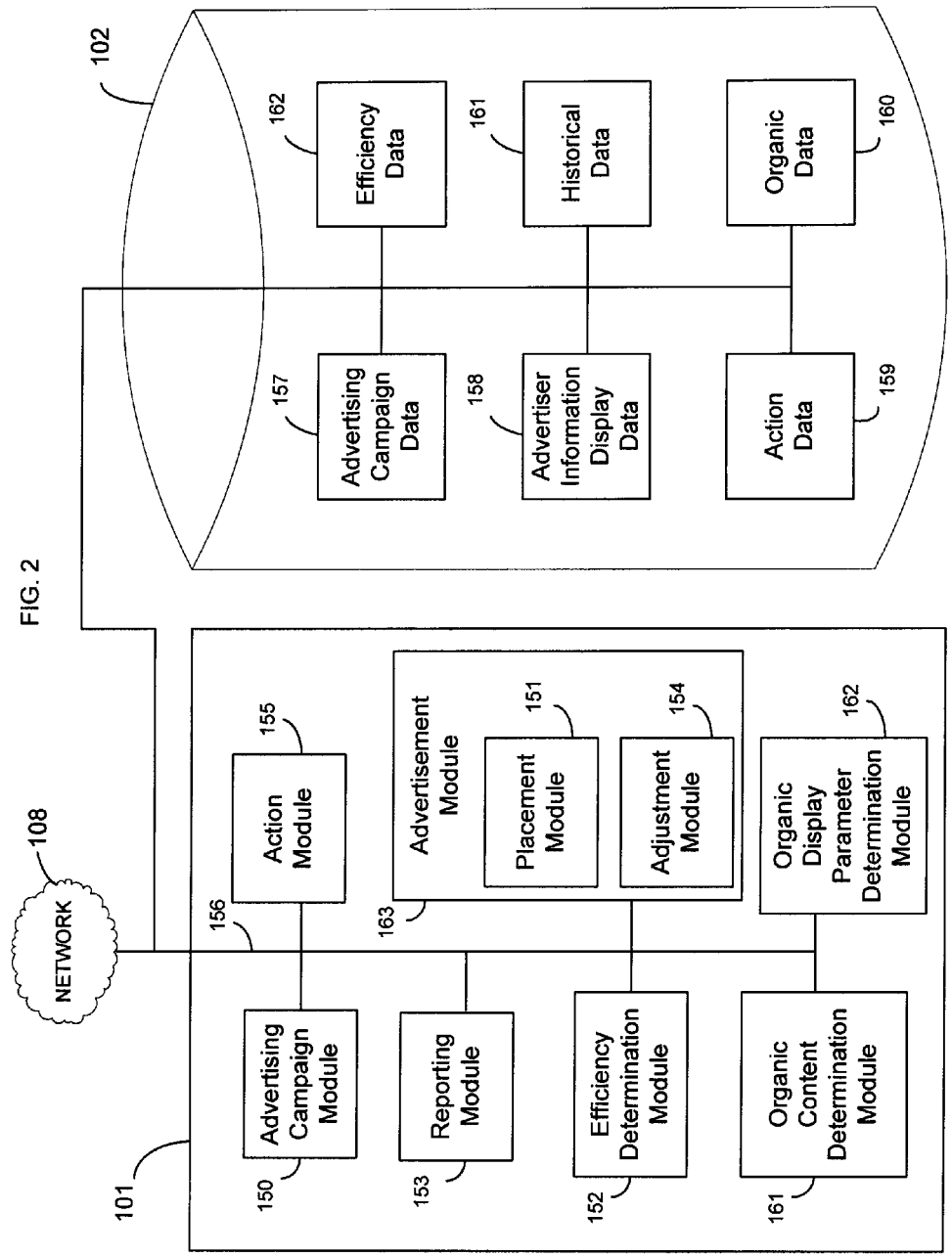
FIG. 2 depicts an exemplary campaign optimization computer system according to various embodiments of the disclosure.
Figure 3:
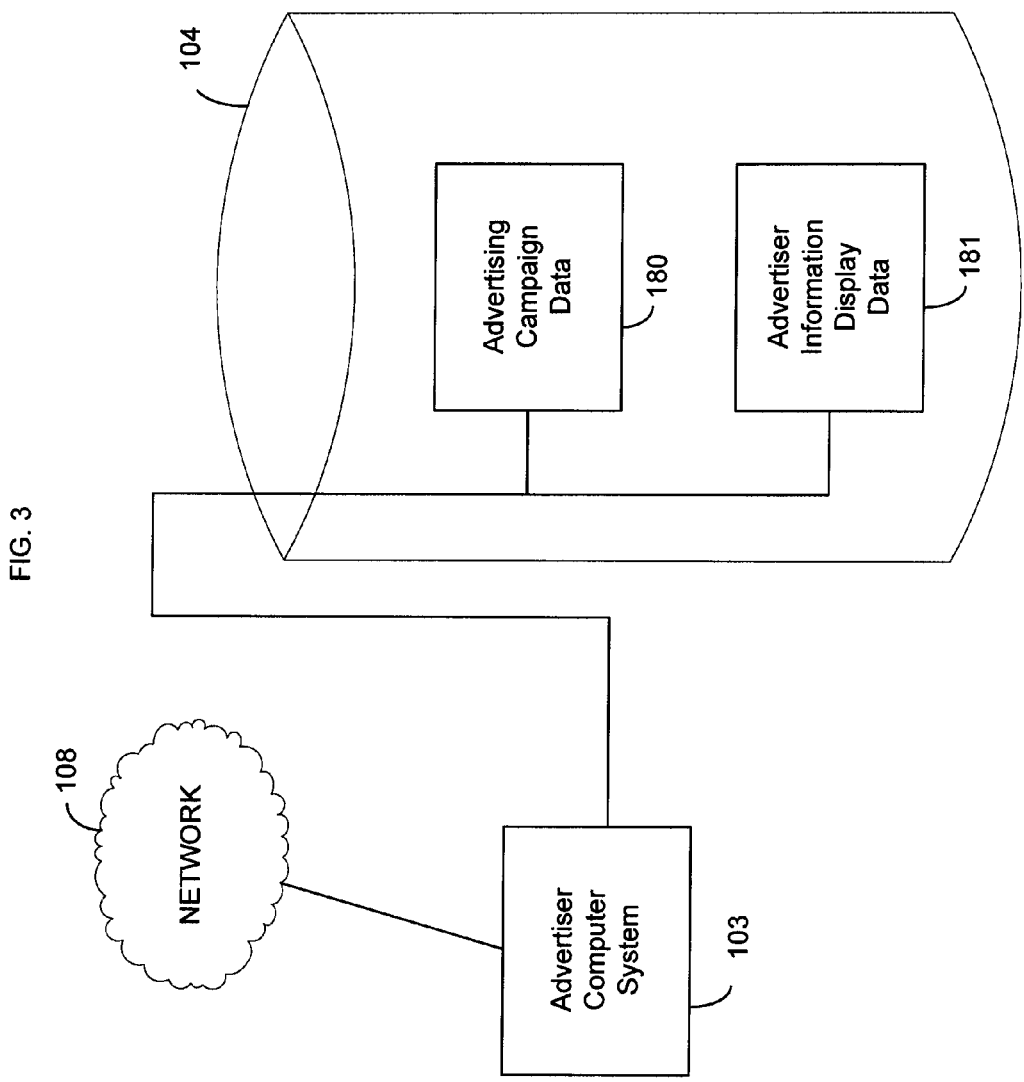
FIG. 3 depicts an exemplary advertiser computer system according to various embodiments of the disclosure.

FIGS. 1 through 3 depict exemplary embodiments of systems for optimizing an electronic advertising campaign according to various embodiments of the disclosure. The systems may involve various network-enabled computer systems to process instructions for optimizing an electronic advertising campaign, including, as depicted in FIG. 1, a campaign optimizer computer system 101, advertiser computer systems 103a-n, advertising venue computer systems 106a-n, and end user computer systems 105a-n.

In various exemplary embodiments, advertiser computer systems 103a-n may each be associated with an individual or entity that desires to advertise. For example, an advertiser may be a merchant attempting to market its products to potential customers or an organization attempting to attract new members. Advertisers often choose to advertise through many different types of advertising venues, such as magazines, newspapers, billboards, and television commercials, to maximize the effectiveness of their campaigns. Advertisers also increasingly use electronic advertising venues either in combination with or as a substitute for more traditional media. Such advertising venues may include, for example and without limitation, Internet search engines (e.g., Google, Yahoo!), online directories, online yellow page sites (e.g., yellowpages.com, superpages.com), online shopping malls, online social networking sites (e.g., myspace.com, facebook.com), online file sharing sites (e.g., youtube.com), banner advertisers (e.g., doubleclick.com), and electronic content publishers (e.g., newspaper websites, blogs). To do so, an advertiser typically provides to the advertising venue an electronic advertisement that can be presented to an end user at the venue. For example, the advertisement may be a banner ad, pop-up ad, textual ad, graphical ad, information about a product or service offered by the advertiser, or any other similar information of interest to end users and potential customers. Local businesses may also desire to advertise electronically to potential customers located in the same geographic region. Advertising venues may allow advertising to those types of individuals specifically.

Such advertising venues may typically charge a fee to the advertiser for displaying its advertisement to end users of the venue. The fee may be based on any type of advertising model. For example and without limitation, the advertiser may pay a certain amount each time its advertisement is displayed on the advertising venue, such as $10 for every 1000 "impressions." Or, the advertiser may pay a set fee whenever an end user "clicks" on the advertisement by, for example, moving a mouse pointer over the advertisement and clicking the mouse, which may redirect the end user's web browser to the advertiser's website. This advertising model is commonly referred to as "Pay Per Click" (PPC) advertising. The amount that advertisers must pay per click may vary depending on the particular advertising venue. For example, an advertising venue that receives more traffic, such as a popular Internet search engine, may charge more than a venue that receives less traffic. Other exemplary advertising models include "Pay Per Call" where the advertiser pays for each telephone call generated by the advertising venue, "Pay Per Delivery" where the advertiser pays for each e-mail generated by the advertising venue, "Pay Per Text" where the advertiser pays for each text message generated by the advertising venue, and "Pay Per Action" where the advertiser pays for each end user action (e.g., sale) generated by the advertising venue.

In various exemplary embodiments, the display of advertisements on an advertising venue and the associated fees charged to advertisers for those displays may be based on keywords or other concept bases. For example, an advertiser may specify to an Internet search engine certain words or combinations of words that should trigger its advertisements and the maximum amount the advertiser is willing to pay per click. When a user queries the Internet search engine for one of those words or if those words appear prominently in the results, the search engine may display the advertiser's advertisement along with the search results. In that way, advertisers can target their ads to only the people most likely to become customers, as opposed to random users. A system may also allow bidding on concepts, such as "basketball," and the system may display the ad within content associated with basketball even if the specific word does not appear in the keyword search. The ordering, size, or other features of how an advertisement is displayed may be based on how much the advertiser agrees to pay in relation to other advertisers as well as many other factors, such as relevance, time, and other factors. For example, because advertising venues want to maximize their own revenue, an ad with the highest bid for a keyword may not be listed first when another ad generates many more clicks (and therefore more revenue for the advertising venue). Although models for an Internet search engine have been described above, any type of advertising venue may use any advertising model. An electronic content publisher, for example, may agree to place ads on pages within its site relevant to a particular keyword and advertisers may then bid on a per impression basis for such placement. An advertising venue may also set minimum and/or maximum bids and may receive bids at set time periods, such as daily or weekly.

As depicted in FIG. 1, advertiser computer systems 103a-n may each be associated with a particular advertiser, a syndicate of advertisers, or an advertising agency, for example. For example, one advertiser computer system 103a-n may represent multiple advertisers. Advertising venue computer systems 106a-n may each be associated with an advertising venue (e.g., Google) or distribution channel (e.g., Google AdWords) where the advertisers want to advertise, as described herein.

End user computer systems 105a-n may each be a computer system associated with or operated by an end user, such as, for example, an individual or entity that may visit one of the advertising venues and/or want to transact business with one of the advertisers. For example, end user computer system 105 may be a personal computer or wireless/mobile device running a web browser program that communicates with advertising venue computer system 106 by electronic transmission over data network 108, such as the Internet. A web browser program on end user computer system 105 may connect to a server of advertising venue computer system 106 and request the Uniform Resource Locator (URL) of a web page from the server. The server may receive the request, process the request, retrieve or create the requested web page (e.g., a web page showing search results or other content requested by the user), and transmit the requested web page to end user computer system 105. The web browser program may receive the web page and render it on a monitor or screen. The end user may then interact with the web page by, for example, clicking on buttons or activating links associated with the web page or entering information with a keyboard. The web browser program may interpret this interaction and send information back to the server to perform various actions as instructed by the customer. Examples of commercial web browser programs suitable for this purpose are Internet Explorer available from Microsoft® Corporation, Safari® available from Apple®, Inc., and Firefox® available from Mozilla Corporation. Web pages may be in various formats, such as HTML (Hypertext Markup Language), XML (Extensible Markup Language), ASP (Active Server Page), Java, JavaScript, XHTML (Extensible HyperText Markup Language), or Ajax (Asynchronous JavaScript and XML) files, or any other file format that allows web pages or portions of web pages to be rendered in a web browser and that various tools are readily available to create and render web pages. An end user may also interact with advertiser computer system 103 or advertising venue computer system 106 (or any other entity or system) in any way. For example, the end user may send a text message from a cell phone, manually call a telephone number operated by the advertiser or use end user computer system 105 to make a call using Voice-over-Internet Protocol (VoIP), access information from advertiser computer system 106 using a mobile/wireless device, access information from advertising venue computer system 106 using a PDA, or access a computer terminal at a retail location operated by the advertiser.

In various exemplary embodiments, campaign optimization computer system 101 may communicate with and provide various services to advertiser computer systems 103a-n to optimize their electronic advertising campaigns.

As described herein, the network-enabled computer systems depicted in FIGS. 1-3 may include, but are not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. The one or more network-enabled computer systems may also include one or more software applications to enable the optimization of an electronic advertising campaign, as described herein.

The components depicted in FIGS. 1 through 3 may also store information in various electronic storage media, such as, for example, a campaign optimization storage mechanism 102, advertiser storage mechanisms 104a-n, and advertising venue storage mechanisms 107a-n, depicted in FIG. 1. It is well-known in the art that electronic information, files, and documents may be stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

The components depicted in FIGS. 1 through 3 may be coupled via one or more networks, such as data network 108. As referred to herein, a network may include, but is not limited to: e.g., a wide area network (WAN), a local area network (LAN), a global network such as the Internet, a telephone network such as a public switch telephone network, a wireless communication network, a cellular network, an intranet, or the like, or any combination thereof. In various exemplary embodiments, a network may include one, or any number of the exemplary types of networks mentioned above, operating as a stand alone network or in cooperation with each other. Use of the term network herein is not intended to limit the network to a single network. The components depicted in FIGS. 1 through 3 may communicate by electronic transmission through the one or more networks mentioned above, by physical delivery, or by any other communication mechanism. Communication between two components depicted in FIGS. 1 through 3 may also include communication with any other entities between the two components.

FIG. 2 depicts an exemplary campaign optimization computer system 101 and campaign optimization storage mechanism 102 for optimizing an electronic advertising campaign according to various embodiments of the disclosure. Campaign optimization computer system 101 may include one or more of the following modules: an advertising campaign module 150, an efficiency determination module 152, an organic content determination module 161, an action module 155, a reporting module 153, an organic display parameter determination module 162, and an advertisement module 163, which may comprise a placement module 151 and an adjustment module 154. One or more of the modules may electronically communicate with each other and/or other entities via a communication mechanism 156, such as a data communication bus or one or more external networks as defined herein, including network 108. The modules may each be a computer program or an appropriately programmed computer or portions thereof spread across such programs or computers, such as a mainframe or personal computer, or may include a plurality of such computers cooperating to perform the functionality described herein. The modules may also communicate with one or more campaign optimization storage mechanisms 102, which may store one or more of the following types of data: advertising campaign data 157, advertiser information display data 158, action data 159, efficiency data 162, historical data 161, and organic data 160, as described herein.

FIG. 3 depicts an exemplary advertiser computer system 103 and advertiser storage mechanism 104 for optimizing an electronic advertising campaign according to various embodiments of the disclosure. Advertiser computer system 103 may include one or more modules that may each be a computer program or an appropriately programmed computer, such as a mainframe, a server system, or personal computer, or may include a plurality of such computers cooperating to perform the functionality described herein. Advertiser computer system 103 may also electronically communicate with one or more advertiser storage mechanisms 104, which may store one or more of the following types of data: advertising campaign data 180 and advertiser information display data 181, as described herein.

In reference to FIGS. 1 through 3, an electronic advertising campaign may involve an advertiser providing information via advertiser computer system 103 to campaign optimization computer system 101 to establish a campaign. For example, an advertiser may subscribe with a campaign optimization service by setting up an account and entering information for the desired campaign, such as one or more of the following: the advertiser's name, information about the products or services the advertiser wants to market, information about the advertiser's prices, the advertiser's slogans, mottos, or trademarks, the advertiser's website address, a list of advertising venues where the advertiser's ad(s) should be placed, or any other information regarding the subject matter of the campaign. It may do so through advertiser computer system 103. An advertiser, through advertiser computer system 103, may also provide a time parameter, such as the period of time that the electronic advertising campaign should be run, and a monetary amount, such as the total budget for the campaign or the maximum bid that the advertiser is willing to pay per click or per impression. The advertiser, through advertiser computer system 103, may further provide to campaign optimization computer system 101 one or more electronic advertisements, such as banner ads or textual ads, as described herein, that should be placed at the various advertising venues for the campaign. Advertiser computer system 103 may further provide one or more keywords for the campaign. For example, keywords may include the name of the advertiser, the names of the products or services that the advertiser desires to market, or any other words or phrases that the advertiser or the entity advising the advertiser determines or believes will help its marketing. Advertiser computer system 103 may also specify a bidding strategy for the campaign to instruct campaign optimization computer system 101 how the campaign should be operated, as described herein. Advertising campaign module 150 may receive and store the above information from advertiser computer system 103.

In various exemplary embodiments, any of the above information for an electronic advertising campaign may also be determined by campaign optimization computer system 101. For example, a merchant advertiser may enter some information about its business and products and advertising campaign module 150 may recommend keywords by parsing the data for words that appear particularly important. Advertising campaign module 150 may also suggest a time parameter or monetary amount for the campaign based on campaigns that have been optimized successfully in the past. For example, campaign optimization computer system 101 may optimize many campaigns for many different advertisers and may therefore have a store of information available for recommending campaign parameters to a new advertiser.

The information described above may be stored as advertising campaign data 180, such as in advertiser storage mechanism 104, and provided electronically to campaign optimization storage mechanism 102 for storage as advertising campaign data 157. Or, the information may be determined by campaign optimization computer system 101 and stored, such as in campaign optimization storage mechanism 102 as advertising campaign data 157.

FIG. 6 depicts exemplary advertising campaign data. Advertising campaign data 300 may comprise entries 309-311 for particular electronic advertising campaigns, as described herein, wherein each is given a campaign number 301. For example, entry 309 may correspond to a campaign for an advertiser called "WidgetCo." Each entry may comprise information associated with the campaign, such as one or more of the following: advertiser ID 302, keyword(s) 303, time parameter 304, monetary amount 305, advertising venues 306, bidding strategy 307, advertisement ID 312, and restrictions/requirements 313. Keyword(s) 303 may be, for example, the particular keywords or phrases determined for the campaign, such as "widget, widgets, 'widgets for sale'" for the campaign of WidgetCo. Keyword(s) 303 may also be text from which keywords may be derived. Time parameter 304 may be, for example, an expiration date for the campaign (e.g., Jan. 1, 2009), a duration for the campaign (e.g., the next two weeks), a set time period (e.g., the Christmas season each year, the first two weeks of every month, Fridays and Saturdays, between 9:00 AM and 5:00 PM every weekday), or any other measure related to time. Monetary amount 305 may be, for example, a budget for the campaign (e.g., $1000 per month), a budget per keyword (e.g., $500 per keyword), a maximum spend amount for the advertiser (e.g., $5000 total), or any other measure related to money. Advertising venues 306 may be, for example, a list of one or more advertising venues in which to advertise (e.g., all, "search.com, news.com, product.com," Google). Bidding strategy 307 may be, for example, a designation for the bidding strategy determined for the advertiser (e.g., dominant, moderate, efficient). As described herein, the advertiser's bidding strategy may factor into the determination whether to make any advertising parameter adjustments based on organic content. For example, when the organic position of an advertiser's advertisement is good (e.g., the first search result), no changes to bidding for a keyword may be made when the advertiser chooses a "dominant" bidding strategy, but the bid price may be decreased if the advertiser chooses a "moderate" strategy or stopped entirely if the advertiser chooses an "efficient" bidding strategy. Advertisement ID 312 may be, for example, an identifier for one or more advertisements for the campaign stored separately by campaign optimization computer system 101 (e.g., 1234abcd for WidgetCo's advertisement). For example, the advertisement may be an image, graphics, banner ad, or any other form of advertisement and may be provided by the advertiser through advertiser computer system 103 or by another entity. Restrictions/requirements 313 may be, for example, one or more restrictions or requirements determined by campaign optimization computer system 101 or another entity for the campaign. For example, as shown in FIG. 6, WidgetCo may have decided for business reasons that it should not advertise wherever "Product X" is also advertised. Or, an advertiser may not want to advertise on sites that display objectionable or offensive content. Or, an advertiser may only want to have its ad placed whenever its sales are particularly low or may want to receive a notification before a bid price is changed. In those cases, campaign optimization computer system 101 may periodically communicate with, for example, advertising venue computer system 106 to implement the restrictions or advertiser computer system 103 to receive information about the advertiser's sales levels. Any other information associated with an advertising campaign may be stored as advertising campaign data 300 as well. Also, any type of structure for storing advertising campaign data other than advertising campaign data 300 may be used. As described herein, one or more of the above advertising parameters, as well as any other parameters associated with an advertising campaign, may be adjusted.

In various exemplary embodiments, other information associated with the advertiser may also be provided to campaign optimization computer system 101 by advertiser computer system 103 or may be determined by campaign optimization computer system 101 on its own. Such information may be stored as advertiser information display data 158 in campaign optimization storage mechanism 102 and/or as advertiser information display data 181 in advertiser storage mechanism 104 and may be used to help determine end user actions associated with the advertisement using a reverse proxy server, as described herein. For example, the advertiser information display data may comprise a web page or image for the advertiser, although any advertiser information display may be provided.

Once the advertising campaign data for a particular campaign is determined, placement module 151 (or advertisement module 163) may initiate placement of the advertiser's advertisement at advertising venues based on determined advertising campaign data. Various mechanisms for placing an ad at an advertising venue may be used, such as those that would be understood by those skilled in the art. For example, placement module 151 may electronically provide advertisement data to advertising venue computer system 106 via network 108. Such advertisement data may include one or more of the following: an advertisement, advertisement parameters used by the advertising venue computer system (e.g., URL text of ad, images, etc.), a set of keywords, and/or a placement value for each (e.g., a maximum bid that the advertiser is willing to pay per click for each keyword/concept). Placement module 151 may also provide a link (or other type of association) to a website operated by campaign optimization computer system 101 on behalf of the advertiser, which may allow end user actions relating to the advertisement to be tracked, as described herein. Campaign optimization computer system 101 may pay advertising venue computer system 106 on behalf of the advertiser, the advertiser may pay the advertising venue directly, or any other billing arrangement may be used. Campaign optimization computer system 101 may also allow the advertiser to customize the features, duration, or costs of advertisements placed at specific venues.

Advertising venue computer system 106 may then proceed to operate the venue and display the advertisement when appropriate. For example, if the advertising venue determines based on its own formula that a particular ad should be shown (e.g., based on the bid price for the keyword, relevance, time, or any other factors), the advertiser's ad may be displayed on the venue. If the user clicks on the advertisement or performs another type of designated action, advertising venue computer system 106 may charge the respective per action rate for that action.

In some advertising models, when a user clicks on (or otherwise provides an indication regarding) an advertisement displayed by advertising venue computer system 106, the user's web browser may be directed to the website or screen of the advertiser (e.g., the link that the advertiser provided for the advertisement). In various exemplary embodiments of this disclosure, the link provided by campaign optimization computer system 101 may be not be a link to the advertiser's website, but rather a link to a "reverse proxy" server operated by campaign optimization computer system 101. In that case, the reverse proxy server may cause a web page to be rendered on the user's computer system that appears to be substantially the same as the advertiser's regular web page, but replaces contact information for the advertiser (e.g., telephone number, e-mail address) with contacts operated and monitored by campaign optimization computer system 101 (or a system that provides information about end user actions to campaign optimization computer system 101). In that way, end user actions after a click may be tracked in various ways. For example, the HTTP query string sent to campaign optimization computer system 101 when a user clicks on a particular ad may comprise an identifier for the ad and an identifier for the keyword that triggered the ad. The information may be stored as action data 159 in campaign optimization storage mechanism 102.

Action module 155 may then determine various actions that the user takes and associate the actions with the original "triggering" advertisement and keyword. The user may, for example, purchase a product from the advertiser, visit a physical location of the advertiser, register himself or herself on the website, send an e-mail to an e-mail address displayed on the web page that is operated and monitored by campaign optimization computer system 101 (or a system that provides information about end user actions to campaign optimization computer system 101), or make a telephone call to a telephone number displayed on the web page that is operated and monitored by campaign optimization computer system 101 (or a system that provides information about end user actions to campaign optimization computer system 101). Campaign optimization computer system 101 may determine the keyword associated with each end user action in various ways. For telephone calls, campaign optimization computer system 101 may use dynamic number insertion where a particular telephone number in a set of available numbers is assigned to each keyword. Or, one telephone number may be used for all calls and campaign optimization computer system 101 may perform an algorithm to determine the keyword associated with each call. For example, campaign optimization computer system 101 may review a number of clicks that occurred within the time period of the telephone call and determine what keyword was used the most for those clicks. Or, campaign optimization computer system 101 may partially weight the telephone call to multiple keywords. For product purchases or store visits, campaign optimization computer system 101 may provide a coupon with the reverse proxied advertiser web page that the end user can print out and bring with them. The coupon may include an indication (e.g., a bar code) for an associated keyword or other information, which may then be provided to campaign optimization computer system 101.

Any type of end user action may be determined, including, for example and without limitation, web page clicks, web page views, intra-site web page clicks, intra-site web page views, unique web page views, impressions, telephone calls, e-mails, store visits, conversions, or sales, as will be understood by those skilled in the art. Campaign optimization system 101 may be associated with any type of system or server (e.g., e-mail server, call server) for determining such information. Also, any metrics relating to end user actions, such as click-through rate (e.g., number of clicks divided by number of impressions), call-through rate, or e-mail-through rate, may be used as well, as will be understood by those skilled in the art. Campaign optimization computer system 101 may receive data, such as the number of impressions, from advertising venue computer system 106 to determine such measures. Information regarding end user actions and metrics may be received from any other source as well. For example, if the advertiser is a large e-commerce website, campaign optimization computer system 101 may receive information regarding sales by product or profit margin by product from advertiser computer system 103.

Figure 11:
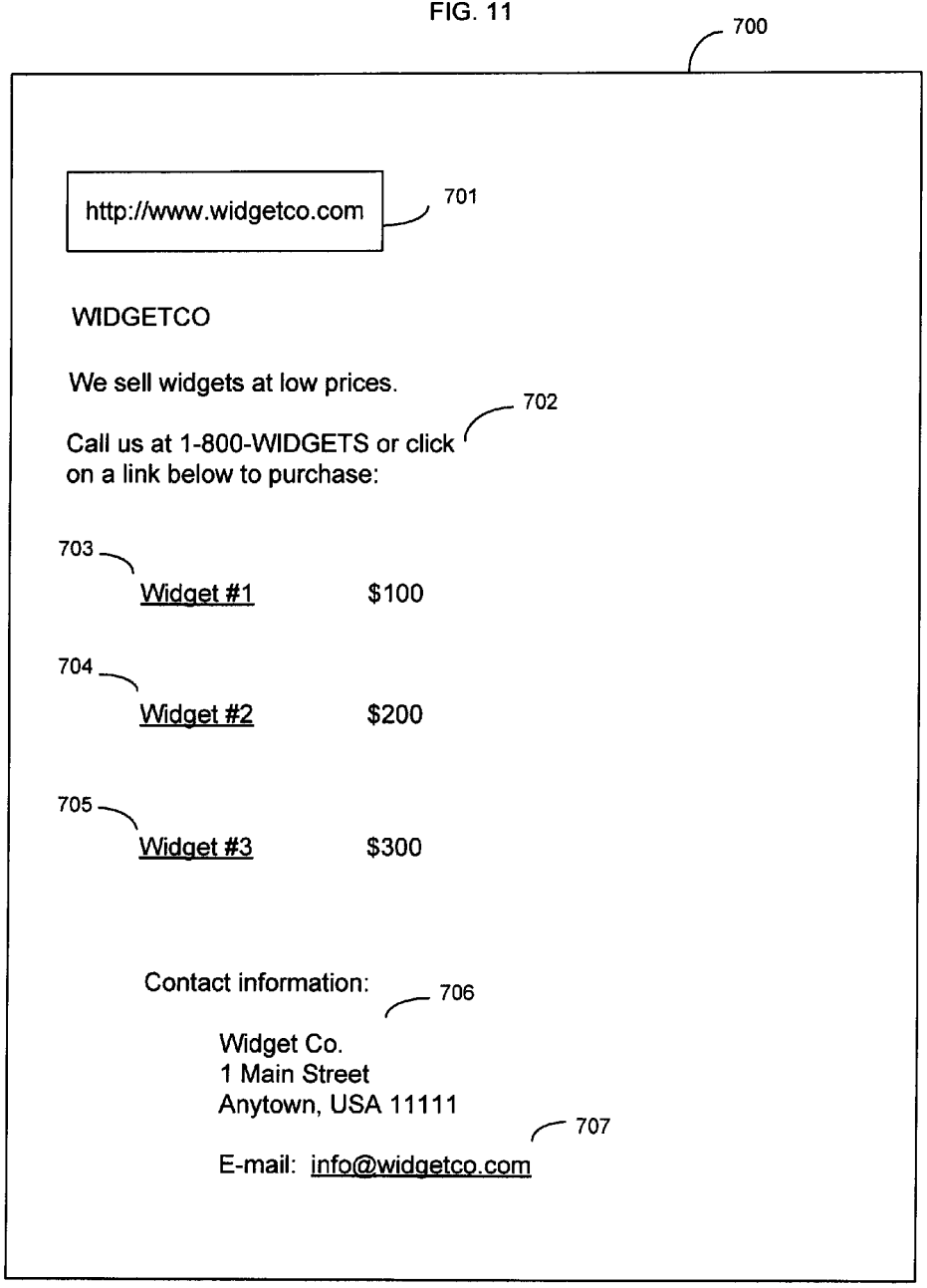
FIG. 11 depicts an exemplary advertiser web page with contact information.

The operation of the exemplary reverse proxy server described above will be described in reference to FIGS. 11-13. FIG. 11 depicts an exemplary advertiser web page with contact information. An end user may navigate to advertiser web page 700 by, for example, typing the URL widgetco.com into a web browser or clicking on a link for WidgetCo at an Internet search engine page (such as link 506a in FIG. 9). Advertiser web page 700 may comprise information about the advertiser, its products and services, its contact information, and/or any other information about the advertiser. Advertiser web page 700 may display, for example, a URL 701, a contact telephone number 702 (e.g., "1-800-WID-GETS"), product links 703-705, address 706, and e-mail address 707. Advertiser computer system 103 may provide the information necessary to render advertiser web page 700, such as HTML code and graphics, to campaign optimization computer system 101 (or a system that provides information about end user actions to campaign optimization computer system 101) such that campaign optimization computer system 101 may itself render the page if requested by an end user.

Figure 12:
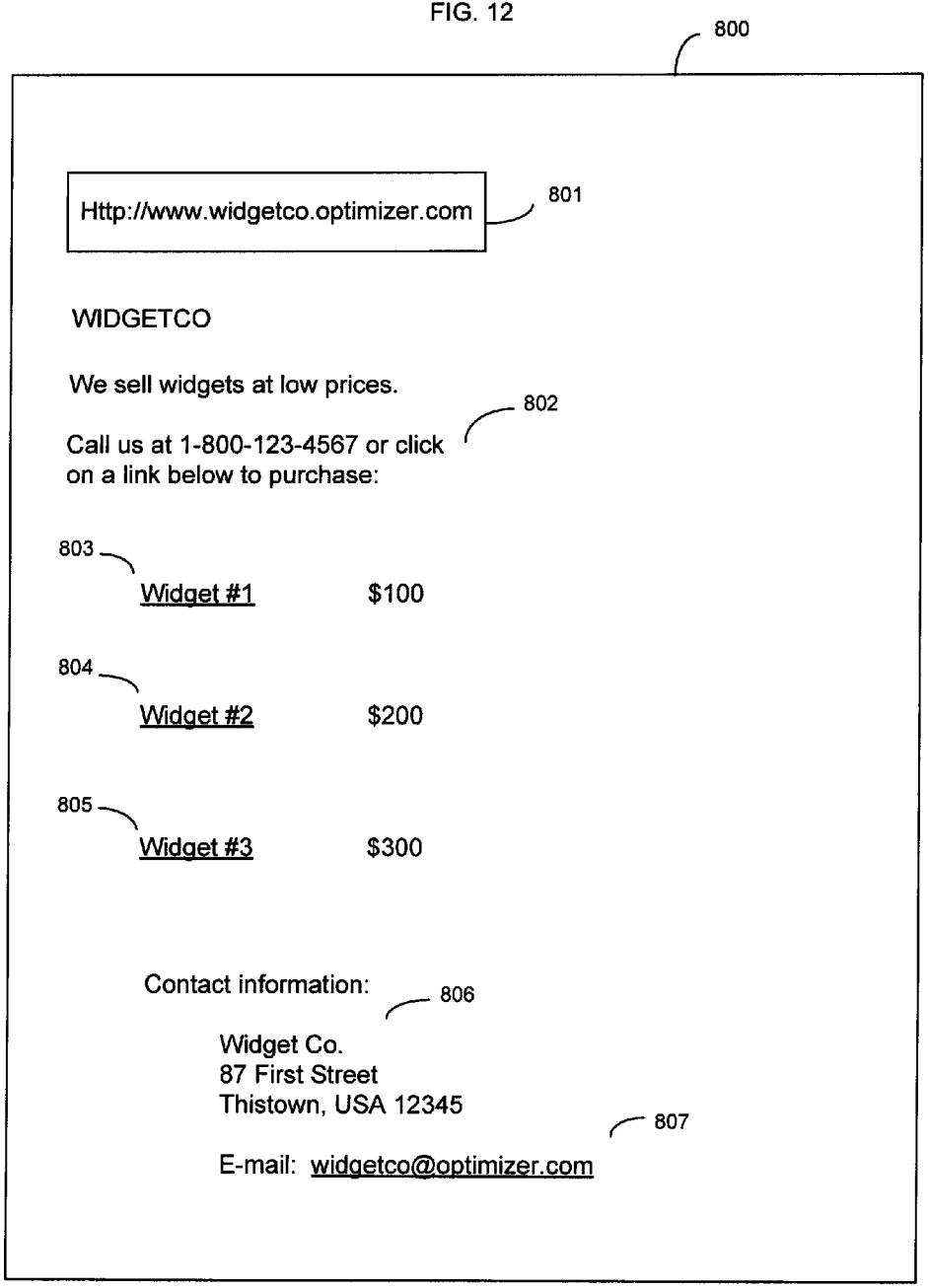
FIG. 12 depicts an exemplary reverse proxied advertiser web page with contact information.

FIG. 12 depicts an exemplary reverse proxied version of the advertiser web page depicted in FIG. 11. As described herein, a reverse proxy server of campaign optimization computer system 101 may provide reverse proxied advertiser web page 800 when the end user clicks a link on an Internet search engine page (such as link 506a in FIG. 9) or otherwise attempts to navigate to the advertiser's website from an advertising venue. Reverse proxied advertiser web page 800 may appear to the end user to be substantially identical to the advertiser's regular web page, but may replace contact information for the advertiser with contact information for campaign optimization computer system 101. For example, the URL 801 may be for the reverse proxy server rather than the advertiser (e.g., "widgetco.optimizer.com" rather than "widgetco.com"), address 806 may be for an entity operating or associated with campaign optimization computer system 101, and/or e-mail address 807 may be an address monitored or associated with campaign optimization computer system 101. In addition, product links 803-805 may link to web pages operated by campaign optimization computer system 101 rather than the advertiser. If an end user chooses to purchase a product from the advertiser through those pages, for example, campaign optimization computer system 101 may communicate information to and from advertiser computer system 103 to complete the sale. In various exemplary embodiments, all or some of the differences in contact information between advertiser web page 700 depicted in FIG. 11 and reverse proxied advertiser web page 800 depicted in FIG. 12 may be invisible or unnoticeable by the end user. For example, product links may be clicked without knowing from where the resulting page comes, the telephone number and address may be generic rather than specific for the advertiser, and the e-mail address may be a link rather than a specific listed address. In that way, the end user may be substantially unaware that his or her actions are tracked by campaign optimization computer system 101, which may store actions performed by the end user, as described herein. Also, any other system or entity may operate the reverse proxy server and provide information about end user actions to campaign optimization computer system 101. Also, the reverse proxy server may be part of campaign optimization computer system 101 or may be separate and communicate with campaign optimization computer system 101 electronically over network 108.

Although a reverse proxy server is described in various exemplary embodiments above, any other mechanism for determining end user actions may be used as well. For example, end user actions may be determined by a "page tracking" mechanism rather than a reverse proxy server. Advertising venue computer system 106 may insert a particular code, link, or other mechanism in its web page (e.g., widgetco.com), which may provide campaign optimization computer system 101 with information associated with an end user action, such as a click or product purchase. The mechanism may be unseen to the end user as well. For example, an advertiser's HTML web page may include an invisible JavaScript or Java applet that causes data (e.g., an indicator for the end user action, the time and date of the end user action, and/or the keyword associated with the end user action) to be provided over the Internet to campaign optimization computer system 101. Doing so may be beneficial to large advertisers where it may be more expensive to operate a reverse proxy server.

Figure 13:
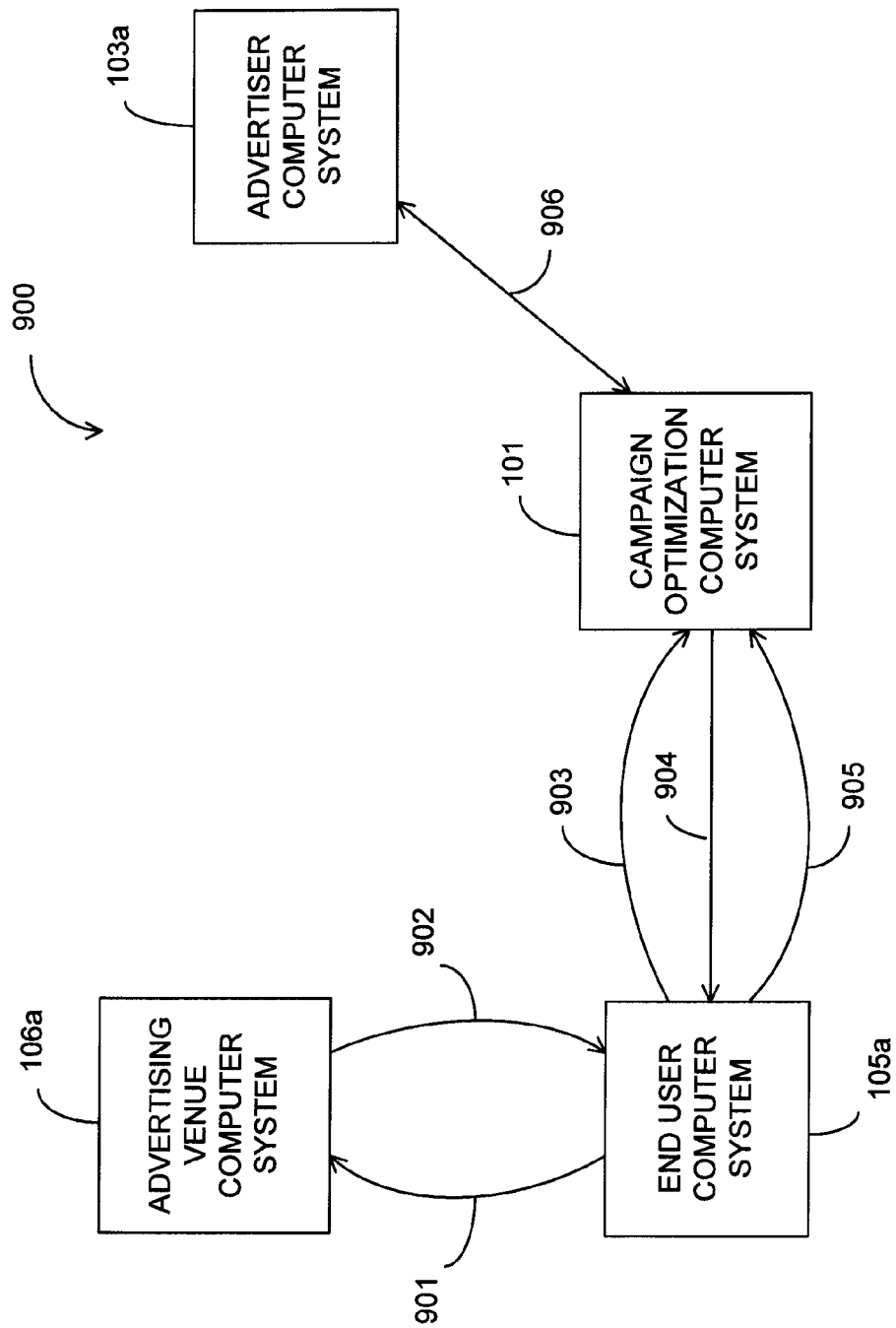
FIG. 13 depicts an exemplary data flow depicting the operation of a reverse proxy server.

FIG. 13 depicts an exemplary data flow depicting the operation of a reverse proxy server, as described herein. At step 901, an end user, through end user computer system 105, may request a search for a particular keyword (e.g., "widget") from an advertising venue (e.g., Google) by typing the keyword into a web page provided by advertising venue computer system 106. At step 902, advertising venue computer system 106 may return a web page with search results and an advertisement for an advertiser (e.g., WidgetCo). The advertisement may be associated with a link to a reverse proxy server operated by campaign optimization computer system 101 (e.g., widgetco.optimizer.com) rather than the advertiser's regular website (e.g., widgetco.com). At step 903, the end user may click on the link causing end user computer system 105 to request the URL of the reverse proxy server. At step 904, campaign optimization computer system 101 may return a reverse proxied advertiser web page, such as that depicted in FIG. 12. At step 905, the end user may click on a link on the reverse proxied advertiser web page to purchase a product causing end user computer system 105 to request a corresponding URL from the reverse proxy server. At step 906, campaign optimization computer system 101 and advertiser computer system 103 may communicate to complete the sale. Campaign optimization computer system 101 may also store actions performed by the end user, as described herein.

Although web pages are described in the exemplary embodiments above, any type of interface or display that allows end user actions to be determined may be provided to the end user by campaign optimization computer system 101. For example, a display may appear on the screen of a wireless/mobile device or personal digital assistant (PDA) that communicates action information to campaign optimization computer system 101 (or a system that provides information about end user actions to campaign optimization computer system 101). Or, a display may appear on the screen of a computer terminal at a retail location or automated teller machine (ATM) that communicates action information.

FIG. 7 depicts exemplary action data. Action data 350 may comprise entries 357-361 for particular end user actions determined by campaign optimization computer system 101, as described herein, wherein each is given an action number 351. For example, entry 357 may correspond to a web page click that occurred on Aug. 7, 2008 at 1:18 PM, while entry 358 may correspond to an e-mail that was sent on Jul. 1, 2008 at 1:12 PM. Each entry may comprise information associated with the end user action, such as date/time 352, action type 353, advertisement ID 354, keyword(s) 355, and referrer ID 356. Date/time 352 may be the date and time that the action occurred. Action type 353 may be a designation for the type of action that took place. Advertisement ID 354 and keyword(s) 355 may be associated with the original data received from the advertising venue computer system. For entries 357 and 358, the user may have entered the keyword "widget" and "widgets," respectively, and been referred to the proxy site by the WidgetCo advertisement identified as 1234abcd. Referrer ID 356 may be an identifier for the originator of the action. In the case of an e-mail, such as entry 358, the user's e-mail address (e.g., johndoe@email.com) may be known, while in other situations, such as entry 357, the advertising venue (e.g., search.com) may be used because the identity of the user is unknown. Any type of structure for storing action data other than action data 350 may be used as well.

Although the exemplary embodiments above are described in reference to one advertiser, one advertising venue, and one end user, campaign optimization computer system 101 may determine end user actions associated with many different advertisers, many different keywords, many different advertisements, and many different advertising venues over time and thereby accumulate a considerable amount of information regarding how users interact with the advertisers. As described herein, efficiency determinations may be made by efficiency determination module 152 based on the end user actions, which may then be used by adjustment module 154 to adjust the advertising parameters associated with an advertising campaign as necessary to accomplish various goals, such as increasing the usage of more "efficient" keywords and decreasing the usage of less "efficient" keywords or pacing traffic evenly across a month.

In various exemplary embodiments, the advertising parameters that may be adjusted for a campaign may comprise one or more of the following: one or more keywords for the campaign, one or more advertising venues in which to display an advertisement, the placement values themselves (e.g., bid prices for each keyword), the advertisement content, or other parameters. For example, if a keyword is determined to be ineffective for the campaign for some reason, campaign optimization computer system 101 may no longer bid for that keyword in the future. Also, if traffic from a particular advertising venue is found to be inefficient for some reason, campaign optimization computer system 101 may stop placing ads at that venue. Also, if more traffic needs to be driven from a particular keyword (e.g., because 5000 clicks per month were "guaranteed" to the advertiser and only 1000 have occurred after the first two weeks), as described in further detail below, the placement value for that keyword may be adjusted upward accordingly.

The "efficiency" of a keyword listing for a particular advertising campaign may be determined in different ways. For example, efficiency may be determined based solely on the end user actions that occur relating to that keyword. Because end user actions are often of different relative value to different advertisers, campaign optimization computer system 101 (or advertiser computer system 103, for example) may rank or weight the various types of potential actions that may occur for a campaign. For example, a plumber may place a higher relative value on an e-mail request than a web page click, while a florist may place a higher relative value on a telephone call than an e-mail. Actions that are ranked higher for the campaign may be factored into the efficiency determination moreso than lower ranked actions.

To illustrate, a campaign may use two keywords at a particular advertising venue, one of which generated 1000 user clicks while the other generated 200 user clicks. The first keyword may therefore be deemed more efficient such that it should be emphasized in the future by, for example, using it instead of the second keyword, increasing its placement value slightly to drive even more traffic, and/or using that advertising venue rather than others. Any other parameters may be altered as well to emphasize the more efficient keyword. In another illustrative example, the first keyword may have generated 100 user clicks and no user telephone calls, while the second keyword generated 50 user clicks and 20 user telephone calls. Campaign optimization computer system 101 or advertiser computer system 103 may have also determined that telephone calls are five times more valuable than clicks (e.g., because they are more likely to lead to sales). In that case, the second keyword may be deemed more efficient and emphasized in the future, even though the first keyword technically generated more end user actions. Any formula, calculation, or computation may be used to rank or weight end user actions.

In various exemplary embodiments, a keyword's efficiency may have both an efficiency component, as described above, and a price component. The efficiency component may be a measure of the efficiency of the keyword based on the end user actions themselves, while the price component may be a measure of the efficiency of the keyword based on its placement value (e.g., bid price). Because advertisers (as well as campaign optimization computer system 101 that provides a service to the advertisers) may not have unlimited budgets, it may be desirable to account for the cost necessary to place an ad in relation to a target price, as described herein. If, for example, a certain efficient keyword should be emphasized but it would be very expensive to do so, it may not be beneficial to adjust the advertising parameters. The price component may take into account any factors relating to the placement value of the keyword, such, for example and without limitation, the placement value itself (e.g., current bid price, average bid price for the keyword for a given day), a price ceiling (e.g., a maximum bid price), and a price target (e.g., a target bid price for a given day that may be derived from margin goals and the placement value). The factors may be set by the advertiser through advertiser computer system 103 or by campaign optimization computer system 101. Efficiency determination module 152 may also periodically determine the end user actions and efficiency of keywords for a campaign and make the corresponding adjustments at any point in time, such as daily or weekly.

In one illustrative example, a particular campaign may have three potential end user actions for a particular keyword: clicks, telephone calls, and e-mails. It may have generated over the last week 40 user clicks, 20 user telephone calls, and 10 user e-mails for the keyword. It may also have been determined that e-mails are more valuable to the advertiser than telephone calls, which are in turn more valuable than clicks. Therefore, the weights assigned to the actions may be as follows: 20% for clicks, 30% for telephone calls, and 40% for e-mails. The efficiency rank for the keyword may be determined according to the following formula:

$$\text{Efficiency Rank(ER)} = (\text{Action1} * \text{ActionWeight1}) + \\ (\text{Action2} * \text{ActionWeight2}) + \\ (\text{Action3} * \text{ActionWeight3})$$

The resulting efficiency rank may therefore be 18 (8+6+4). A price rank may be determined as well. The keyword may have had a price ceiling of $0.80, a target price of $0.60, and an actual bid price of $0.60. The price rank for the keyword may be determined according to the following formula:

$$\text{Price Rank(PR)} = (\text{ActualPrice} - \text{TargetPrice}) * \text{MarginWeight}$$

The resulting price rank may therefore be 0 because the target price matched the actual bid price. The efficiency rank and price rank may be combined into one rank in various ways, such as, for example, by multiplying or summing them. Campaign optimization computer system 101 may then compare the efficiency rank and price rank (or a combined rank) for the keyword to those of other keywords to determine appropriate adjustments, such as raising or lowering the bid price for the keyword by a percentage derived from its ranking. Campaign optimization computer system 101 may store such information as efficiency data 162 in campaign optimization storage mechanism 102.

FIG. 8 depicts exemplary efficiency data. Efficiency data 400 may comprise entries 414-418 for particular keywords in advertising campaigns, as described herein, wherein each is given an entry number 401. For example, entry 414 may correspond to the keyword "widgets" at advertising venue search.com for the WidgetCo advertising campaign. Each entry may comprise information associated with the efficiency determination, such as one or more of the following: date/time 419 of the determination, advertising venue 402, keyword 403, campaign number 404, first action weight 405, second action weight 406, third action weight 407, efficiency rank 408, price target 409, actual price 410, margin weight 411, and price rank 412. Action weights 405-407 may be the weights assigned to each potential end user action for the keyword, as determined by the advertiser or campaign optimization computer system 101. Efficiency rank 408 and price rank 412 may be the determined ranks that are compared with other keywords, as described herein. Any type of structure for storing efficiency data other than efficiency data 400 may be used as well.

In various exemplary embodiments, adjustments may be made to advertising parameters to achieve the goal of pacing traffic evenly (i.e., evenly spreading customer actions) over a certain period of time. For example, campaign optimization computer system 101 may "guarantee" to the advertiser a certain number of clicks or other end user actions per month, such as 1000 clicks per month, for a set fee. The advertising may not be of much value to the advertiser, however, if all 1000 clicks took place on the first day of the month. Campaign optimization computer system 101 may therefore adjust the advertising parameters of the campaign periodically during the time period to try to spread them out evenly, while at the same time ensuring that the traffic comes from the most efficient keywords.

In the illustrative example above, the keyword may have generated over the last week 40 end user clicks, 20 end user telephone calls, and 10 end user e-mails. Campaign optimization computer system 101, however, may have "guaranteed" to the advertiser a rate of 200 clicks per month, indicating that the pacing for end user clicks is slightly behind the projected amount for that point in time (the campaign is 22.5% into the month so 45 clicks should have been delivered, but only 20%/40 clicks were delivered). Adjustment module 154 may therefore adjust various advertising parameters to account for the difference and attempt to accurately pace the 200 clicks. For example, the bid price for the keyword may be raised slightly or other keywords may be dropped in favor of the current keyword. Correspondingly, if the pacing was ahead of schedule after the first week, the bid price for the keyword may be lowered slightly or even removed for a period of time. Also, to account for normal dips and rises in a campaign, adjustments may be based on moving averages of efficiency data rather than current efficiency data. For example, a seven-day moving average may be a more accurate measure than the efficiency data at any one point in time.

While the above examples are described in reference to one keyword, campaign optimization computer system 101 may evaluate rankings for all keywords across all advertising venues for all advertisers' advertising campaigns. The determination of what advertising parameters to adjust and when may be made for each keyword on a periodic basis, such as daily. Campaign optimization computer system 101 may also store information about efficiency determinations over time as historical data 161 in campaign optimization storage mechanism 102. Such information may be used to determine changes in efficiency over time. For example, the determination of what adjustments to make and when may be based on both current efficiency data as well as historical efficiency determinations. Future adjustments may also be predicted based on efficiency data over time with the ultimate goal to drive more end user actions from more efficient keywords and less end user actions from less efficient keywords.

In various exemplary embodiments, advertising parameter adjustments may also be made based on the particular needs or preferences of the advertiser (or any other entity). An advertiser that requires more sales to meet a quota, for example, may have bid prices for its keywords increased to drive up sales for a particular time period. Or, bid prices for the campaign of a hotel or hotel chain advertiser may be changed based on estimated occupancy for a given time frame (e.g., raised when estimated occupancy is low, lowered when estimated occupancy is high). Or, adjustments may be based on actual inventory availability. For example, if current inventory for a merchant's product is high, the keyword bid prices for the merchant's campaign may be increased to sell off more of the inventory. Likewise, if inventory is low, bid prices may be reduced until a balance is reached. In that way, the advertiser may be able to achieve "just in time" advertising.

In various exemplary embodiments, reporting module 153 of campaign optimization computer system 101 may report to various components, such as those depicted in FIG. 1, data relating to advertising campaigns. For example, campaign optimization computer system 101 may e-mail a document describing the status of a campaign, how particular keywords are performing, and what adjustments have been made, over the past month. Reporting may be performed in any number of other ways as well, as will be understood by those skilled in the art.

Figure 4:
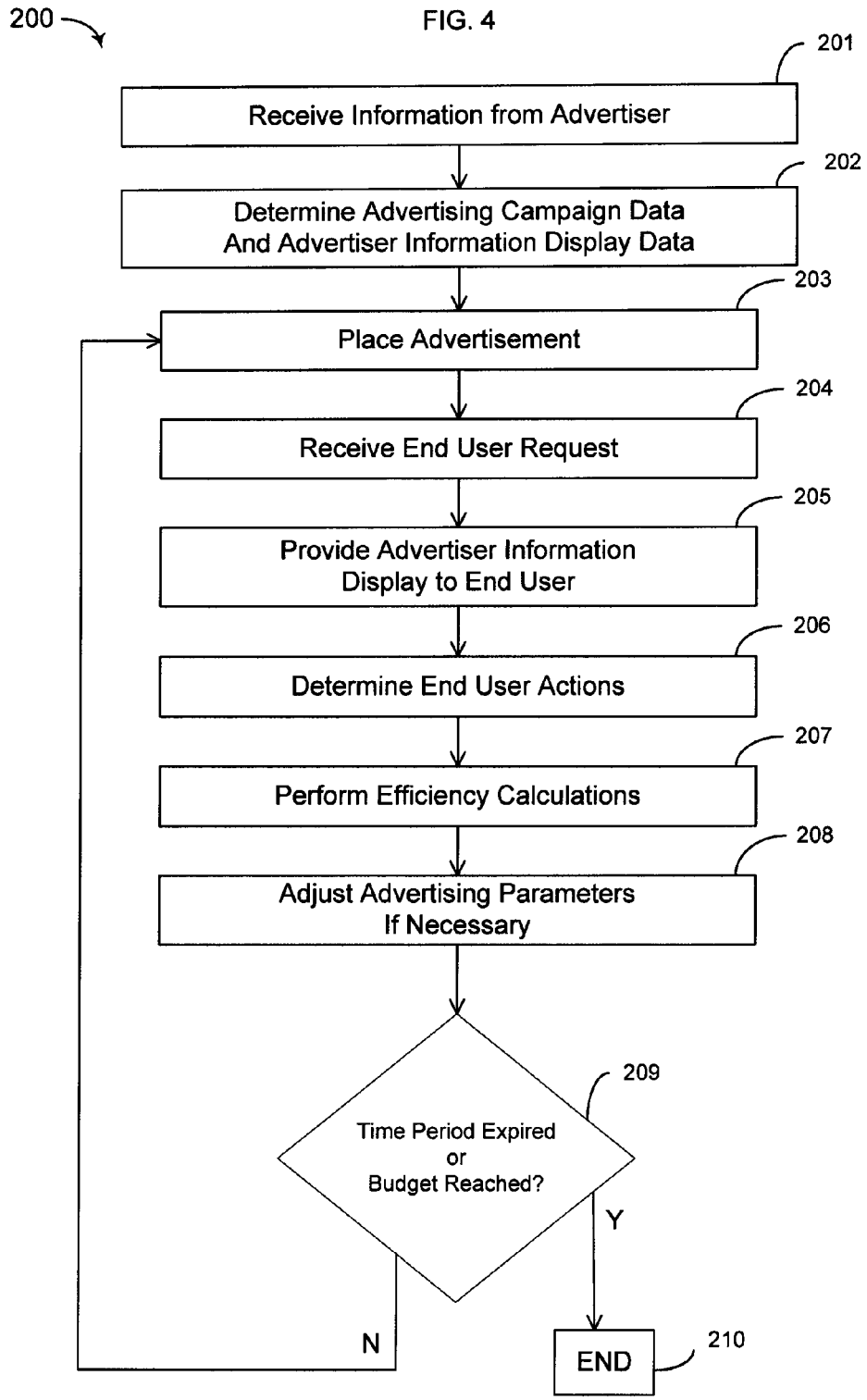
FIG. 4 depicts an exemplary flow chart which illustrates an exemplary method for optimizing an electronic advertising campaign by adjusting advertising parameters based on end user actions according to various embodiments of the disclosure.

FIG. 4 depicts an exemplary flow chart which illustrates an exemplary method 200 for optimizing an electronic advertising campaign by adjusting advertising parameters based on end user actions according to various embodiments of the disclosure. At step 201, a campaign optimization computer system may receive information from an advertiser for establishing an electronic advertising campaign. For example, the advertiser may provide information regarding what it would like to advertise, when to advertise, and how much to spend. At step 202, the campaign optimization computer system may determine advertising campaign data (e.g., based on the information provided by the advertiser) as well as advertiser information display data (e.g., a web page for creating a reverse proxied advertiser web page). At step 203, the campaign optimization computer system may place the advertiser's ad with a plurality of advertising venues, such as Internet search engines. The ad may be associated with a link to a reverse proxy server operated by the campaign optimization computer system, as described herein. At step 204, the reverse proxy server may receive a request for an advertiser information display (e.g., an HTTP request for a web page). For example, the ad may have been displayed on a venue and the end user may have clicked on the ad, causing a request to be made for the advertiser's reverse proxied web page. At step 205, the campaign optimization computer system may provide the requested display to the end user. At step 206, the campaign optimization computer system may determine end user actions, such as clicks, e-mails, telephone calls, and sales, as described herein. At step 207, the campaign optimization computer system may perform various calculations to determine the efficiency of keywords used in the campaign, particularly those with associated end user actions. At step 208, the campaign optimization computer system may adjust advertising parameters for the campaign if necessary. For example, bid prices may be raised or lowered, keywords may be changed, or the advertising venues or advertisement itself may be changed. At step 209, the campaign optimization computer system may determine whether the time period for the campaign has expired or whether the advertiser's budget has been reached. If either is true, the campaign may end at step 210. If not, the campaign optimization computer system may return to step 203 and begin the process again.

In various exemplary embodiments, an electronic advertising campaign may be optimized based on organic content as well. As used herein, organic content may be understood to refer to, for example, content of an advertising venue display distinct from locations of paid advertisements. An advertising venue display may be, for example and without limitation, the results page of an Internet search engine, a web page of an online yellow page site, a web page of a social networking website, a news article of an electronic content publisher, or a blog website. The content may be displayed in any way on any type of device (e.g., a web page on a web browser of a personal computer, a screen on a wireless/mobile device or PDA, a screen on a retail location computer terminal). The advertising venue display may, for example, comprise one or more portions of the display with paid advertisements (e.g., banner ads, graphical ads), one or more portions with unpaid advertisements, and/or one or more portions with organic content (e.g., organic search results, organic business entries for an online yellow page site, text of a news article, text of a blog entry). Just as advertisers may benefit from basing their advertising decisions on end user actions over time, they may also benefit from using organic content of the advertising venues in which they want to advertise to optimize their advertising strategies. If organic content indicates that an advertiser's information is already positioned in a noticeable location of a display, for example, the advertiser may not want to pay as much (or at all) for advertising at that particular venue. Likewise, if organic content indicates that the advertiser's information is not present or positioned in a poor location on the display, the advertiser may want to increase what it spends on advertising at that venue.

As described herein in reference to FIG. 1, advertising venue computer system 106 may typically provide advertising venue displays to other components, such as end user computer systems 105, upon request. For example, an end user may navigate his or her web browser to the site of an Internet search engine, type in a particular keyword, and the advertising venue may return a results page with both organic results and paid advertisements.

In various exemplary embodiments of the disclosure, organic content determination module 161 of campaign optimization computer system 101 may determine organic content of an advertising venue display. Organic content determination module 161 may request, receive, and store an advertising venue display from one of the advertising venue computer systems 106 where the advertiser is currently advertising. The request may also be targeted for specific organic content related to the advertiser's campaign. For example, if the electronic advertising campaign of a particular advertiser is currently bidding on the keyword "basketball" at a particular Internet search engine, campaign optimization computer system 101 may provide an HTTP request to the search engine for search results for the keyword "basketball." Or, campaign optimization computer system 101 may request a screen display wirelessly. Or, campaign optimization computer system 101 may request news articles about "basketball" from a news website where the advertiser is currently advertising.

Upon receiving the content of the advertising venue display (e.g., HTML of a web page, an electronic file for generating the display), organic content determination module 161 may determine what portion(s) of the content are organic content and what portion(s) are not. For example, a portion of the display with organic content may be labeled "Search Results," while a portion of the display with paid advertisements may be labeled "Sponsored Links" or "Sponsor Results." Or, a text portion of the display may be organic content, while a graphical portion of the display may be paid advertisements. Or, the bottom portion of the display may be organic content, while the top and right-hand portions of the display may be paid advertisements. Or, the entire display may be organic content or the entire display may be a paid advertisement. Any mechanism may be used to access or scan an advertising venue display and differentiate between organic content and advertisement information. Further, the determination may be performed differently for each advertising venue based on the venue's particular features.

Organic display parameter determination module 162 of campaign optimization computer system 101 may then determine an organic display parameter for an advertisement based on organic content of the display. In various exemplary embodiments, the organic content of the display may be searched for information associated with an advertiser and the organic display parameter may be an indication of the prominence of such information within the display. For an Internet search engine results page, the organic display parameter may be the relative or numbered position of an identifier associated with the advertiser within the organic content. For example, the display may be searched for the name of the advertiser, such as "WidgetCo." If a link to WidgetCo's website is the first result in a list of organic search results for the keyword "widgets," WidgetCo may not want to pay to also advertise on the same page. If, however, WidgetCo is not listed in the organic search results, WidgetCo may be losing business to other sellers of widgets and want to increase its advertising at that venue. In that way, the organic display parameter may be used by campaign optimization computer system 101 to provide the most effective results for the advertiser. The identifier may also be a name of a product or service offered by the advertiser (e.g., "widgets"), a web address or e-mail address of the advertiser, or any other information associated with the advertiser, its campaign, or its products or services. The organic display parameter may be determined in any way and may be any measure other than relative or numbered position as well. For example, campaign optimization computer system 101 may analyze the structure of line feeds and spaces to determine a position. Or, campaign optimization computer system 101 may search within both organic and paid listings. Campaign optimization computer system 101 may also store information associated with organic content and organic display parameter determinations for later use, such as in organic data 160 of campaign optimization storage mechanism 102. For example, keywords, advertising venues, dates, times, and organic positions may be stored.

In various exemplary embodiments, campaign optimization computer system 101 may then adjust one or more of the advertising parameters for the campaign based on the determined organic display parameter. The advertising parameters may be, for example and without limitation, one or more of the following: one or more of the advertiser's keywords, one or more advertising venues, one or more placement values, or the content of the advertiser's advertisement. For example, the bid price for the keyword may be increased if the advertiser is not listed in the organic content of the display or decreased if the advertiser appears prominently in the display. The advertiser's bidding strategy, as stored in advertising campaign data 309 of FIG. 6, for example, may also be used to determine the appropriate adjustments (if any). For example, if an advertiser has chosen a "dominant" bidding strategy and its current organic position is first through third, no changes may be required because the advertiser's actual placement matches its bidding strategy. Likewise, if an advertiser has chosen a "moderate" bidding strategy and its current organic position is first through third, campaign optimization computer system 101 may lower the bid price for the keyword slightly. Conversely, if an advertiser has chosen an "efficient" bidding strategy and its current organic position is first through third, campaign optimization computer system 101 may stop bidding entirely for the keyword. Similar adjustments may be made based on organic positions. For example, a matrix of bidding strategies, organic positions, and potential adjustments may be maintained and referenced as necessary by campaign optimization computer system 101. A separate matrix may be maintained for each advertising venue. Once any adjustments are determined, campaign optimization computer system 101 may place an advertisement for the advertiser with various advertising venues based on the determined advertising parameters, as described herein. Or, if the adjustment is to stop bidding on the keyword entirely, campaign optimization computer system 101 may determine not to place an advertisement.

Campaign optimization computer system 101 may determine and store organic content and corresponding organic display parameters periodically. For example, campaign optimization computer system 101 may automatically "spider" particular advertising venues, such as Internet search engines, for each keyword of each advertiser's campaign every day. In that way, adjustments based on organic display parameters may be made more often and be more beneficial to advertisers. Also, as will be recognized by those skilled in the art, campaign optimization computer system 101 may operate multiple servers to "spider" advertising venues because many venues use frequency filters to restrict any one computer from using too much bandwidth.

Figure 9:
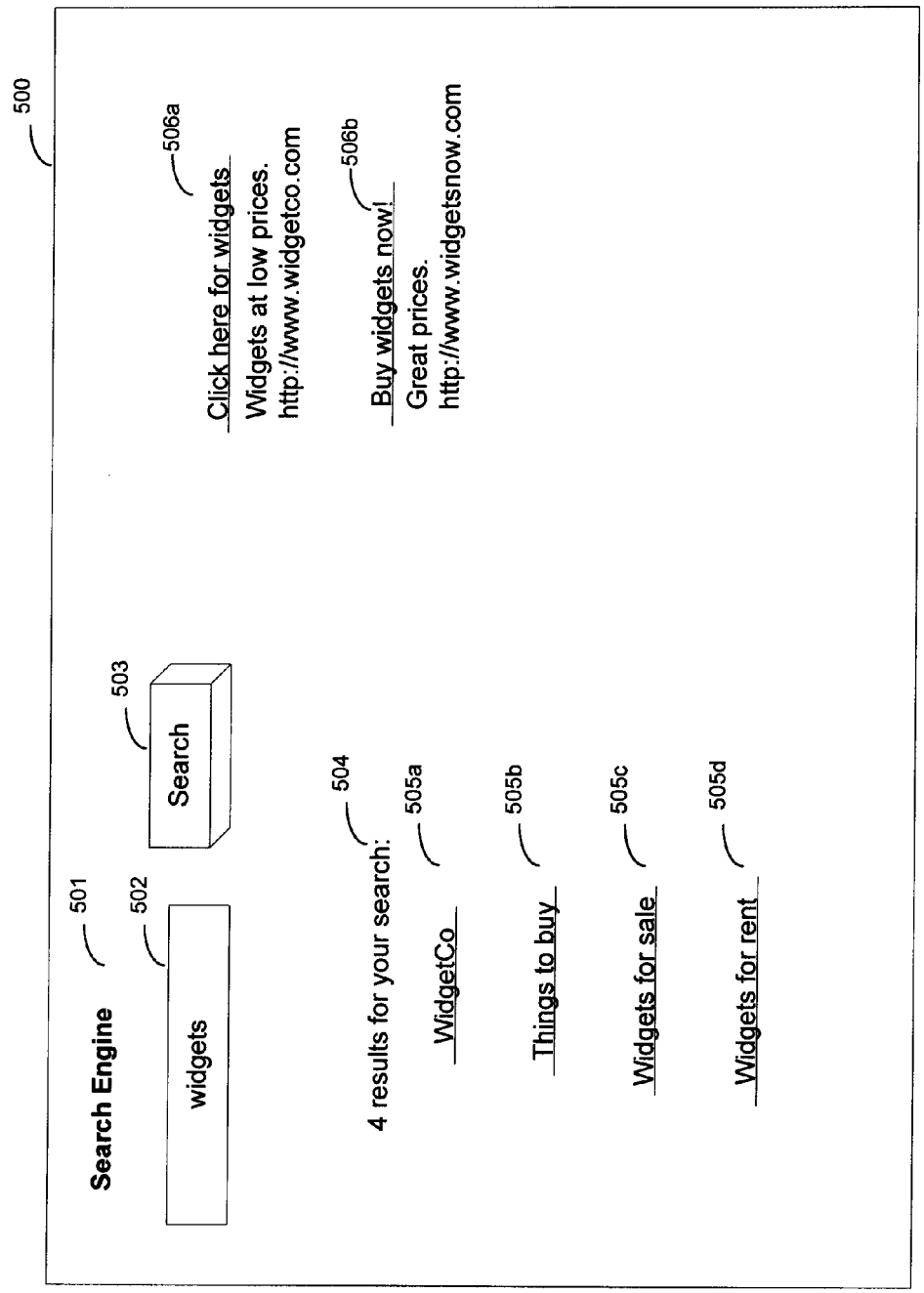
FIG. 9 depicts an exemplary Internet search engine advertising venue display with organic content.

FIG. 9 depicts an exemplary Internet search engine advertising venue display with organic content. The display 500 may comprise one or more of the following: a title bar 501, a keyword entry bar 502, a search activation button 503, an organic search results title 504, organic search results 505a-d, and advertisements 506a-b. The advertising venue display 500 may be provided in response to a search request for the keyword "widgets." As depicted in FIG. 9, organic search results 505a-d may be multiple links to websites related to widgets. For example, organic search result 505a may be a link to WidgetCo's website. The link may be the first result listed and therefore in the most prominent position for a viewer looking for widgets. Advertisements 506a-d may be multiple paid advertisements (e.g., text and links) for companies that also offer widgets. WidgetCo may have bid a certain amount to the search engine to display its advertisement 506a for the keyword "widgets."

In reference to FIG. 9, campaign optimization computer system 101 may receive the content of display 500 and determine organic content for the display (e.g., organic search results 505a-d). For example, campaign optimization computer system 101 may search for the word "results" or the words "results for your search." Because different advertising venues have different labels and mechanisms for distinguishing organic content from advertisements, campaign optimization computer system 101 may search for different content depending on the venue providing the display. Campaign optimization computer system 101 may then determine the organic display parameter for WidgetCo within display 500, which may be a designation for "first" indicating that the WidgetCo website is the first link that appears in organic search results 505a-d. Based on this information, campaign optimization computer system 101 may adjust various advertising parameters for WidgetCo's campaign to account for the fact that WidgetCo is the first result listed in the organic content. For example, campaign optimization computer system 101 may decrease the bid price for the keyword "widgets," bid on other keywords instead, change WidgetCo's advertisement, or advertise on different venues instead.

Figure 10:
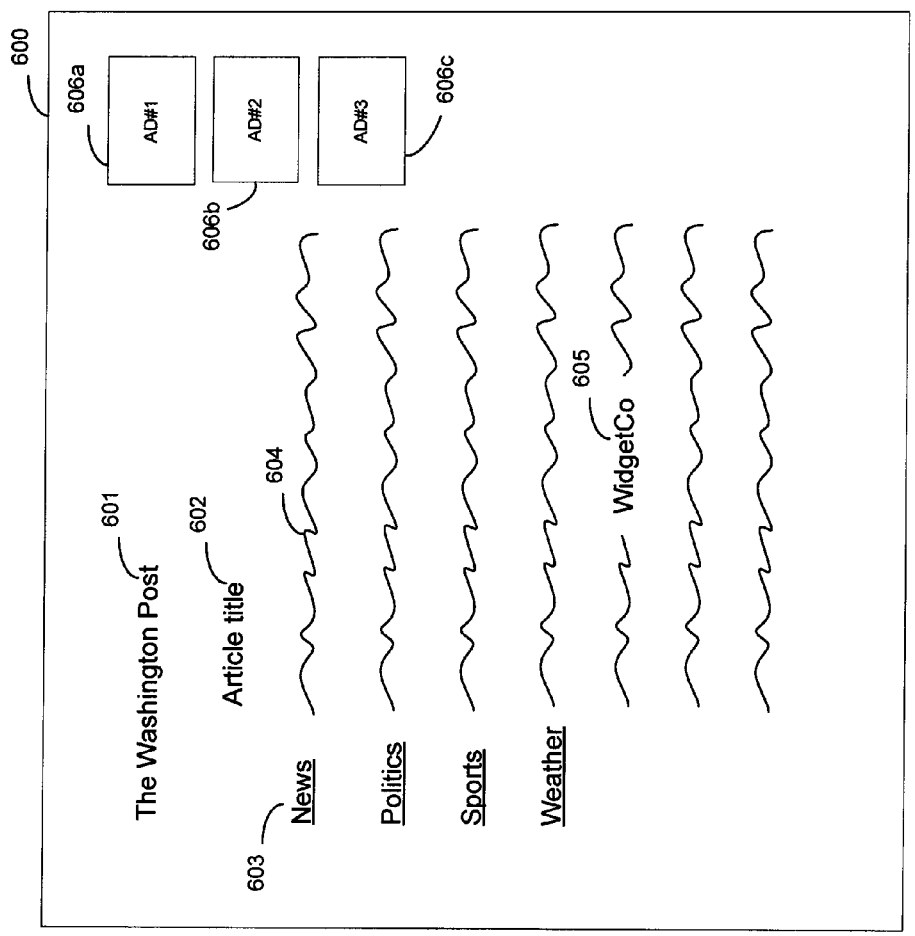
FIG. 10 depicts an exemplary web page advertising venue display with organic content.

An organic display parameter may also be determined for other types of advertising displays, such as content from electronic publishers. FIG. 10 depicts an exemplary web page advertising venue display with organic content. Display 600 may be a news article, for example, comprising one or more of the following: a website title 601, an article title 602, a menu bar 603, article text 604, and advertisements 606a-c. Campaign optimization computer system 101 may request pages from a particular advertising venue computer system for the keyword "widgets," receive in response the content of display 600, and determine organic content for the display (e.g., website title 601, article title 602, and article text 604). For example, campaign optimization computer system 101 may extract text (as opposed to graphics, options, menu bars, etc.) from the article. Because different content publishers display organic content in different ways, campaign optimization computer system 101 may search for different content depending on the publisher providing the display. Campaign optimization computer system 101 may then determine the organic display parameter for WidgetCo within display 600. As depicted in FIG. 10, the organic display parameter may be, for example, a measure indicating that the word "WidgetCo" appeared once in the fifth line as the 250th word of the organic content, which may not be a very prominent position for an end user reading the article. Therefore, based on this information, campaign optimization computer system 101 may adjust the advertising parameters for WidgetCo's campaign, such as by increasing the bid price for the keyword "widgets" so that its advertisement may be more likely to appear as one of advertisements 605a-c. In another illustrative example, the word "WidgetCo" may have appeared many times in many prominent positions in the organic content of the display. In that case, WidgetCo may not want to bid on the keyword to avoid having its advertisement placed as one of advertisements 606a-c, which would be unnecessary because of the publicity that WidgetCo already received in the article. In another illustrative example, the word "widgets" may have appeared in many prominent locations within the organic content but WidgetCo may not have appeared. Advertisements for WidgetCo's competitors may also be listed as advertisements 606a-c. In that case, campaign optimization computer system 101 may want to increase WidgetCo's bid price for the keyword substantially, or otherwise adjust its advertising parameters, so that WidgetCo's advertisement may be more likely to be listed and WidgetCo may compete better with other widget providers.

Although web pages are described in the exemplary embodiments above, any type of interface or display with organic content may be provided. For example, an advertising venue display may be a type of display on the screen of a wireless/mobile device, PDA, or computer terminal at a retail location.

Figure 5:
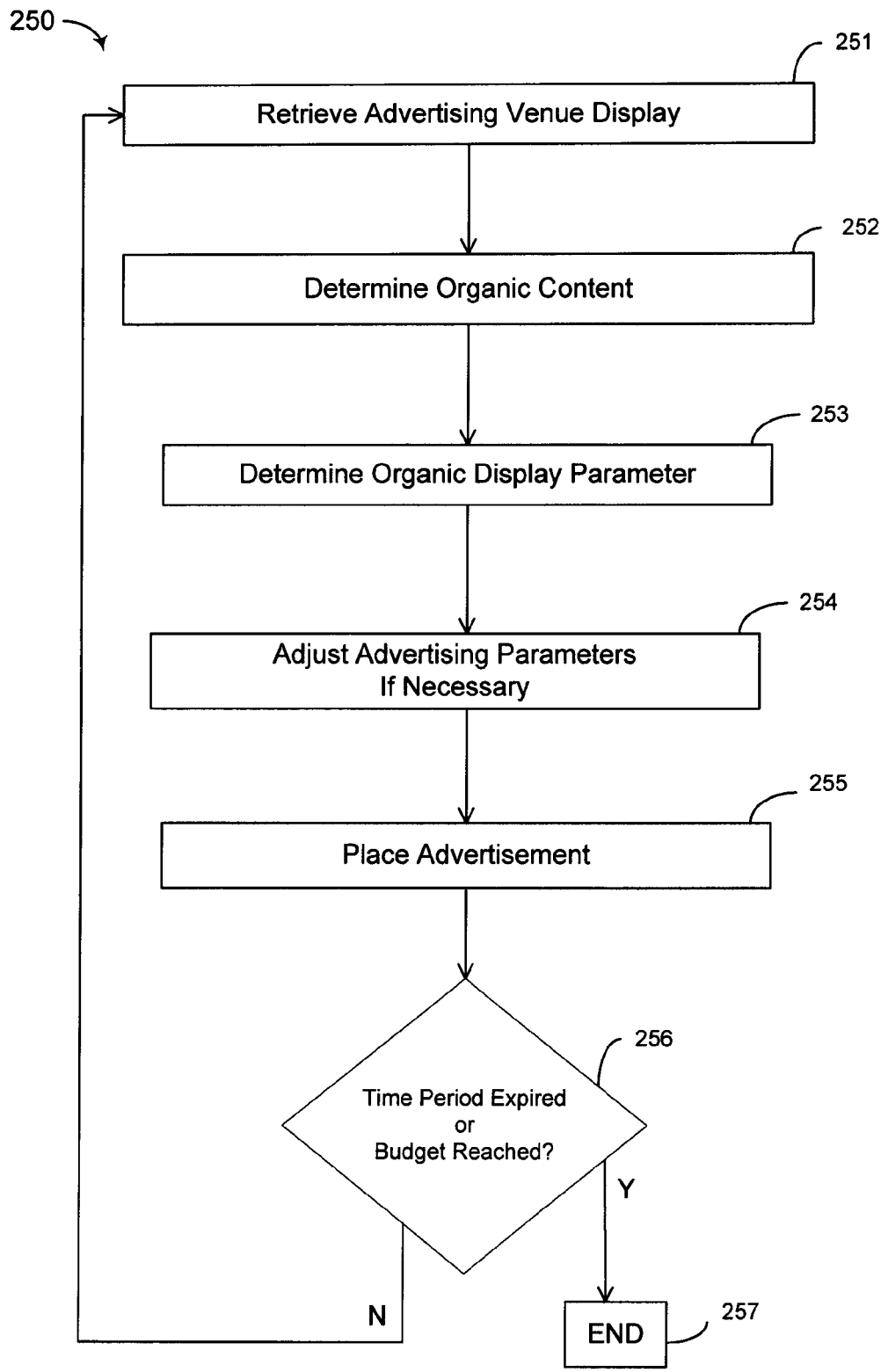
FIG. 5 depicts an exemplary flow chart which illustrates an exemplary method for optimizing an electronic advertising campaign based on organic content according to various embodiments of the disclosure.

FIG. 5 depicts an exemplary flow chart which illustrates an exemplary method 250 for optimizing an electronic advertising campaign based on organic content according to various embodiments of the disclosure. At step 251, a campaign optimization computer system may receive an advertising venue display, such as the results page of an Internet search engine for a particular keyword associated with a campaign, as described herein. At step 252, the campaign optimization computer system may determine organic content of the display by, for example, searching for particular words, phrases, or locations. At step 253, the campaign optimization computer system may determine an organic display parameter for the display, such as the relative position of an identifier associated with the advertiser within the organic content, as described herein. At step 254, the campaign optimization computer system may determine whether any adjustments would be beneficial and, if so, adjust the advertising parameters for the campaign accordingly (e.g., increase or decrease the bid price for the keyword of the search). At step 255, the campaign optimization computer system may place the advertiser's advertisement according the newly determined advertising parameters. At step 256, the campaign optimization computer system may determine whether the time period for the campaign has expired or whether the advertiser's budget has been reached. If either is true, the campaign may end at step 257. If not, the campaign optimization computer system may return to step 251 and begin the process again.

The present invention may benefit advertisers by optimizing their electronic advertising campaigns. For example, when advertising parameter adjustments are made based on end user actions, the advertiser may receive more traffic from more "efficient" keywords that are more likely to generate sales or other revenue for the advertiser. Advertisers may also receive better results from their campaigns when traffic is paced across a period of time by making the adjustments described herein. Further, advertisers may maximize the value of what they spend on advertising when organic content is factored into advertising decisions.

The embodiments of the present invention are not to be limited in scope by the specific embodiments described herein. For example, a campaign optimization computer system may be any type of computer system or systems. Or, any type of end user actions may be determined. Or, any type of organic content may be determined. Or, communication between the components described herein may be by any communication mechanism and information may be stored in any type of electronic storage mechanism. Or, advertising venue displays may be in any format. Or, the systems described herein for optimizing an electronic advertising campaign may be a collection of more than one computer, each operating collectively as the system. Or, the systems may be completely automated such that optimizing an electronic advertising campaign does not require interaction with an operator or a user.

Thus, such modifications are intended to fall within the scope of the following appended claims. Further, although some of the embodiments of the present invention have been described herein in the context of a particular implementation in a particular environment for a particular purpose, those of ordinary skill in the art should recognize that its usefulness is not limited thereto and that the embodiments of the present invention can be beneficially implemented in any number of environments for any number of purposes. Accordingly, the claims set forth below should be construed in view of the full breadth and spirit of the embodiments of the present invention as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

The invention claimed is:

1. A system comprising:
an organic content determination module that determines organic content of an advertising venue display;
an organic display parameter determination module that determines an organic display parameter for an advertisement based on organic content of the display; and
an adjustment module that adjusts one or more advertising parameters based at least in part on the organic display parameter, wherein:
the one or more advertising parameters are associated with an advertising campaign and comprise one or more keywords, one or more advertising venues, one or more placement values, or content of the advertisement, and
the one or more advertising parameters are adjusted for future use in the advertising campaign.

2. The system of claim 1, further comprising:
an advertisement module that determines whether to initiate placement of the advertisement based on the organic display parameter.

3. The system of claim 2, wherein initiating placement of the advertisement comprises providing the advertisement to one or more advertising venues.

4. The system of claim 1, wherein organic content comprises a portion of an advertising venue display distinct from locations of paid advertisements.

5. The system of claim 1, wherein determining the organic content of an advertising venue display comprises providing to the advertising venue a keyword associated with the advertisement and receiving the advertising venue display associated with the keyword from the advertiser.

6. The system of claim 1, wherein the organic content of the advertising venue display is determined at periodic times.

7. The system of claim 1, wherein the organic display parameter is the relative position of an identifier associated with the advertiser within the organic content.

8. The system of claim 7, wherein the identifier is a name of the advertiser.

9. The system of claim 7, wherein the identifier is a name of a product or service.

10. The system of claim 7, wherein the identifier is a web address of the advertiser.

11. The system of claim 7, wherein the organic content is an Internet search engine web page with search results and the organic display parameter is the numbered position of the identifier within the search results.

12. A method comprising:
   determining organic content of an advertising venue display;
   using one or more computer processors, determining an organic display parameter for an advertisement based on organic content of the display; and
   adjusting one or more advertising parameters based at least in part on the organic display parameter, wherein:
      the one or more advertising parameters are associated with an advertising campaign and comprise one or more keywords, one or more advertising venues, one or more placement values, or content of the advertisement, and
      the one or more advertising parameters are adjusted for future use in the advertising campaign.

13. The method of claim 12, further comprising:
   determining whether to initiate placement of the advertisement based on the organic display parameter.

14. The method of claim 13, wherein initiating placement of the advertisement comprises providing the advertisement to one or more advertising venues.

15. The method of claim 12, wherein organic content comprises a portion of an advertising venue display distinct from locations of paid advertisements.

16. The method of claim 12, wherein determining the organic content of an advertising venue display comprises providing to the advertising venue a keyword associated with the advertisement and receiving the advertising venue display associated with the keyword from the advertiser.

17. The method of claim 12, wherein the organic content of the advertising venue display is determined at periodic times.

18. The method of claim 12, wherein the organic display parameter is the relative position of an identifier associated with the advertiser within the organic content.

19. The method of claim 18, wherein the identifier is a name of the advertiser.

20. The method of claim 18, wherein the identifier is a name of a product or service.

21. The method of claim 18, wherein the identifier is a web address of the advertiser.

22. The method of claim 18, wherein the organic content is an Internet search engine web page with search results and the organic display parameter is the numbered position of the identifier within the search results.

23. A computer-accessible medium encoded with computer program code effective to perform the following:
   determine organic content of an advertising venue display;
   determine an organic display parameter for an advertisement based on organic content of the display; and
   adjust one or more advertising parameters based at least in part on the organic display parameter, wherein:
      the one or more advertising parameters are associated with an advertising campaign and comprise one or more keywords, one or more advertising venues, one or more placement values, or content of the advertisement, and
      the one or more advertising parameters are adjusted for future use in the advertising campaign.

* * * * *